Patented Oct. 3, 1950

2,524,392

UNITED STATES PATENT OFFICE 2,524,392

METHOD OF PREPARING N-ALKYL-SUBSTITUTED - 1,2,3,4-TETRAHYDROQUINOLINES AND N-ALKYL-SUBSTITUTED-1,2,3,4-TETRAHYDROISOQUINOLINES

Marlin T. Leffler, Lake Bluff, and Morris Freifelder, Waukegan, Ill., assignors to Abbott Laboratories, North Chicago, Ill., a corporation of Illinois No Drawing. Application January 9, 1947, Serial No. 721,154

8 Claims. (Cl. 260—283)

Our invention relates specifically to a new process for preparing N-n-alkyl-1,2,3,4-tetrahydroquinolines and -isoquinolines and the preparation of certain new compounds of this classification. The compounds prepared by this new process have practical importance in serving as intermediates in the preparation of quaternary ammonium salts of the parent compounds of this application. (See co-pending application, Serial Number 721,153, filed January 9, 1947.)

Prior to our invention it has been necessary to prepare N-n-alkyl-1,2,3,4 - tetrahydroquinolines and -isoquinolines by reacting the 1,2,3,4-tetrahydro-quinoline or -isoquinoline with the appropriate alkyl halide followed by sodium hydroxide as illustrated with 1,2,3,4-tetrahydroquinoline below:

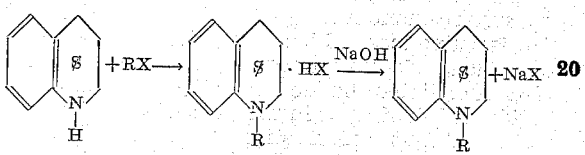

this process has shortcomings in that the yields are relatively poor and the final products are difficult to purify.

Others have produced tertiary amine bases by reducing quaternary heterocyclic compounds like that prepared in the intermediate stage of the reaction illustrated above. The methods of reduction involve using either (a) hydrogen and a noble metal catalyst or (b) chemical reductions. These methods, however, are mainly academic in importance; the noble metal catalysts preclude developing the process on an economical large scale basis and the chemical reduction methods do not give practical yields, for unless the alkyl group is small (such as methyl or butyl); the yields obtained are less than 20%.

Our new process is not only economical but gives very satisfactory yields of 70% and above. The reactions of this process proceed without external heating and at relatively low pressures. The use of increased pressures and temperatures higher than 100° C. are usually unnecessary although they will aid the rate of reaction somewhat; but since the reaction in convenient batches involves 0.25 gram molecule is usually complete in less than one hour, moderate conditions are more practical. Temperature above 100° C. are to be avoided since some decomposition occurs at higher temperatures.

The essence of our process consists of reducing the corresponding quaternary halides of quinoline or isoquinoline (substituted and unsubstituted) with hydrogen gas under pressures of 500 to 3000 lbs. per square inch using a Raney nickel catalyst in the presence of alkali at temperatures ranging from room temperature to 100° C. Using illustrative reactions, our process is:

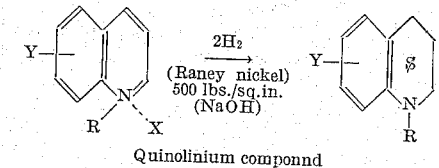

Quinolinium compound

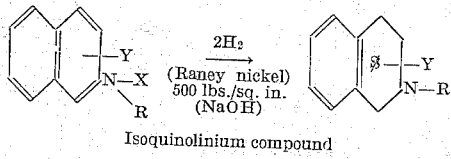

Isoquinolinium compound

R in this case refers to a monovalent alkyl group containing more than nine carbon atoms and less than nineteen carbon atoms; Y is a monovalent group such as hydrogen, methyl, hydroxyl, methoxyl or halogen; X is an anion.

In the practice of the invention one mole of sodium hydroxide per mole of quaternary ammonium compound is necessary. The reduction will not proceed smoothly without this equivalent of alkali inasmuch as it appears to enter into the reaction. The exact mechanism of the reduction and just how the sodium hydroxide enters into it, are not known.

Some of the compounds prepared by this process are listed below:

Substituted 1,2,3,4-tetrahydroquinolines and -tetrahydroisoquinolines

| Compound | R= | Name | Nature | Physical Properties B. P., °C. | $n_D$ |
|---|---|---|---|---|---|
| Tetrahydroquinolines | —$C_{12}H_{25}$ | n-Dodecyl | Liquid | 190°/3 mm | 25° C.—1.5069. |
|  | —$C_{14}H_{29}$ | n-Tetradecyl | do | 205–210°/4 mm | 28° C.—1.5122. |
|  | —$C_{16}H_{33}$ | n-Hexadecyl | Solid | 220°/3mm | (M. P. 25–8° C.). |
|  | —$C_{18}H_{37}$ | n-Octadecyl | do | 220°/3 mm | (M. P. 34–5° C.). |
| 6—OH; | —$C_{16}H_{33}$ | 6-Hydroxyl-N-n-hexadecyl | do |  | M. P. 124° C. |
| 6—O$CH_3$; | —$C_{16}H_{33}$ | 6-Methyoxy-N-n-hexadecyl | Semi-solid |  |  |
| Tetrahydroisoquinolines | —$C_{10}H_{21}$ | n-Decyl | Liquid | 190–191°/5 mm | 25° C.—1.5053. |
|  | —$C_{12}H_{25}$ | n-Dodecyl | do | 180–185°/3 mm | 25° C.—1.492. |
|  | —$C_{14}H_{29}$ | n-Tetradecyl | do | 200–202°/3 mm | 28° C.—1.4954. |
|  | —$C_{16}H_{33}$ | n-Hexadecyl | Solid | M. P. 36° C |  |
|  | —$C_{18}H_{37}$ | n-Octadecyl | do | M. P. 43° C |  |
| —$(CH_2)_2$—O$(CH_2)_2$—O$C_6H_5CH_3p$ |  | p-Toloxyethoxyethyl | do | M. P. 61–62° |  |
| 3—$CH_3$—N—$C_{12}H_{25}$ |  | 3-Methyl-N-n-dodecyl | Liquid | B. P. 170°/4 mm | 27° C.—1.5032. |

Given below are specific examples of the preparation of three of these compounds:

EXAMPLE 1

*N-n-tetradecyl-1,2,3,4 - tetrahydroquinoline.* — A mixture of about 203 grams of N-n-tetradecylquinolinium bromide, about 20 grams of Raney nickel catalyst and about 21 grams of sodium hydroxide in approximately 600 cc. of absolute alcohol is placed in a bomb suitable for pressure reductions. Hydrogen gas is introduced under pressure until the pressure within the bomb is 500 lbs./sq. in. or above. Pressures up to 3000 lbs./sq. in. or higher can be used, but are really unnecessary. The rate of reduction is increased somewhat by higher pressures, but the completeness of the reaction is not influenced. Agitating the reaction mixture expedites the reduction. The theoretical amount of hydrogen (2 moles per mole of quinolinium compound) is absorbed in about 2 hours or less depending on the activity of the catalyst.

When the reduction is complete, the reaction mixture is filtered by suction to remove the catalyst and precipitated sodium bromide. After evaporating the filtrate to dryness under vacuum on a steam bath, the residue is taken up in ether or benzol and washed carefully (emulsions may form) with water. Then the organic layer is dried and vacuum distilled. The product boils at about 205° C. at 4 mm. Instead of reducing the quinolinium bromide compound, either the iodide or chloride may be used with equal success.

EXAMPLE 2

*N-n-hexadecyl-6-hydroxy-1,2,3,4 - tetrahydroquinoline.*—To a solution of about 4.5 grams of N-n-hexadecyl-6-hydroxyquinolinium bromide in 95 cc. of absolute alcohol is added 1.2 grams of Raney nickel catalyst and 0.45 gram of sodium hydroxide. This is reduced with hydrogen and worked up in the same manner as described in Example No. 1. The product is a liquid boiling at 200–202° C. at 3 mm.; $n_D^{27}$ 1.5007.

EXAMPLE 3

*N-n-dodecyl-3-methyl - 1,2,3,4 - tetrahydroisoquinoline.*—A solution of about 80 grams of N-n-dodecyl-3-methylisoquinolinium iodide in 400 cc. of absolute alcohol is treated with 15 grams of Raney nickel and 7.3 grams of sodium hydroxide and then reduced with hydrogen gas under the same conditions described in Example No. 1 and the product is isolated in the same manner likewise. It is a liquid boiling at about 170° C. at 4 mm.; $n_D^{27}$ 1.5032.

In the designation of the index of refraction, "n," the subscript, "D," identifies the D line of sodium, and the superscript states the centigrade temperature at which the diffraction was measured. M. P. and B. P. are used to refer to melting point and boiling point respectively.

Others may readily adapt the invention for use under various conditions of service, by employing one or more of the novel features disclosed, or equivalents thereof. As at present advised with respect to the apparent scope of our invention, we desire to claim the following subject matter.

We claim:

1. The process of preparing a compound selected from the group consisting of N-R-1,2,3,4-tetrahydro-quinolines and N-R-1,2,3,4-tetrahydro-isoquinolines which comprises reacting a compound selected from the group consisting of N-R-quinolinium halide and N-R-isoquinolinium halide with hydrogen in the presence of a Raney nickel catalyst and alkali metal hydroxide, and at a pressure of about 500 to 3,000 pounds per square inch and at a temperature of about room temperature to about 100° C., where R represents a higher monovalent alkyl group containing 10 to 18 carbon atoms and the reaction mixture contains at least one mole of alkali metal hydroxide to one mole of quaternary ammonium halide.

2. The process of preparing a compound selected from the group consisting of N-R-1,2,3,4-tetrahydro-quinolines and N-R-1,2,3,4-tetrahydro-isoquinolines which comprises reacting a compound selected from the group consisting of N-R-quinolinium halide and N-R-isoquinolinium halide with hydrogen in the presence of a Raney nickel catalyst and sodium hydroxide, and at a pressure of about 500 to 3,000 pounds per square inch and at a temperature of about room temperature to about 100° C., where R represents a higher monovalent alkyl group containing 10 to 18 carbon atoms and the reaction mixture contains at least one mole of sodium hydroxide to one mole of quaternary ammonium halide.

3. The process of preparing a compound selected from the group consisting of N-R-1,2,3,4-tetrahydro-quinolines and N-R-1,2,3,4-tetrahydro-isoquinolines which comprises reacting in absolute alcohol a compound selected from the group consisting of N-R-quinolinium halide and N-R-isoquinolinium halide with hydrogen in the presence of a Raney nickel catalyst and sodium hydroxide, and at a pressure of about 500 to 3,000 pounds per square inch and at a temperature of about room temperature to about 100° C., where R represents a higher monovalent alkyl group containing 10 to 18 carbon atoms and the reaction mixture contains at least one mole of sodium hydroxide to one mole of quaternary ammonium halide.

4. The process of preparing N-n-tetradecyl-1,2,3,4-tetrahydroquinoline, which comprises; reacting a N-n-tetradecyl-quinolinium halide with hydrogen in the presence of a Raney nickel catalyst and an alkali metal hydroxide, at a pressure of about 500 to 3,000 pounds per square inch, and at a temperature of about room temperature to about 100° C., the reaction mixture containing at least 1 mole of the alkali-metal hydroxide to 1 mole of N-n-tetradecylquinolinium halide.

5. The process of preparing N-n-dodecyl-1,2,3,4-tetrahydroquinoline, which comprises; reacting a N-n-dodecylquinolinium halide with hydrogen in the presence of a Raney nickel catalyst and an alkali-metal hydroxide, at a pressure of about 500 to 3,000 pounds per square inch, and at a temperature of about room temperature to about 100° C., the reaction mixture containing at least 1 mole of the alkali-metal hydroxide to 1 mole of N-n-dodecylquinolinium halide.

6. The process of preparing N-n-hexadecyl-1,2,3,4-tetrahydroquinoline, which comprises; reacting a N-n-hexadecylquinolinium halide with hydrogen in the presence of a Raney nickel catalyst and an alkali-metal hydroxide, at a pressure of about 500 to 3,000 pounds per square inch, and at a temperature of about room temperature to about 100° C., the reaction mixture containing at least 1 mole of the alkali-metal hydroxide to 1 mole of N-n-hexadecylquinolinium halide.

7. The process of preparing N-n-tetradecyl-1,2,3,4-tetrahydroisoquinoline, which comprises; reacting a N-n-tetradecylisoquinolinium halide with hydrogen in the presence of a Raney nickel catalyst and an alkali-metal hydroxide, at a pressure of about 500 to 3,000 pounds per square inch, and at a temperature of about room temperature to about 100° C., the reaction mixture containing at least 1 mole of the alkali-metal hydroxide to 1 mole of N-n-tetradecylisoquinolinium halide.

8. The process of preparing N-n-hexadecyl-1,2,3,4-tetrahydroisoquinoline, which comprises; reacting a N-n-hexadecylisoquinolinium halide with hydrogen in the presence of a Raney nickel catalyst and an alkali-metal hydroxide, at a pressure of about 500 to 3,000 pounds per square inch, and at a temperature of about room temperature to about 100° C., the reaction mixture containing at least 1 mole of the alkali metal hydroxide to 1 mole of N-n-hexadecylisoquinolinium halide.

MARLIN T. LEFFLER.
MORRIS FREIFELDER.

REFERENCES CITED

The following references are of record in the file of this patent:

UNITED STATES PATENTS

| Number | Name | Date |
| --- | --- | --- |
| 282,488 | Bohringer | Aug. 7, 1883 |
| 2,251,922 | Dickey et al. | Aug. 12, 1941 |

FOREIGN PATENTS

| Number | Country | Date |
| --- | --- | --- |
| 395,231 | Great Britain | July 13, 1933 |
| 421,196 | Great Britain | Dec. 17, 1934 |

OTHER REFERENCES

Ser. No. 352,325, Kulz (A. P. C.), published April 20, 1943.